US008619634B2

(12) United States Patent
Meier

(10) Patent No.: US 8,619,634 B2
(45) Date of Patent: Dec. 31, 2013

(54) CHANNEL ASSIGNMENT PROTOCOL

(75) Inventor: Robert C. Meier, Cuyahoga Falls, OH (US)

(73) Assignee: Cisco Technology, Inc., San Jose, CA (US)

( * ) Notice: Subject to any disclaimer, the term of this patent is extended or adjusted under 35 U.S.C. 154(b) by 1296 days.

(21) Appl. No.: 12/102,530

(22) Filed: Apr. 14, 2008

(65) Prior Publication Data

US 2009/0257380 A1    Oct. 15, 2009

(51) Int. Cl.
*H04L 12/28* (2006.01)
*H04W 4/00* (2009.01)
*H04J 3/16* (2006.01)
*G06F 15/173* (2006.01)

(52) U.S. Cl.
USPC ........... 370/256; 370/338; 370/408; 370/437; 709/226

(58) Field of Classification Search
USPC ......... 370/248, 250–252, 254, 256, 312, 328, 370/329, 338, 351, 408, 431–432, 437, 370/449; 709/220, 222, 226
See application file for complete search history.

(56) References Cited

U.S. PATENT DOCUMENTS

| | | | | |
|---|---|---|---|---|
| 6,396,814 | B1 * | 5/2002 | Iwamura et al. | 370/256 |
| 6,636,737 | B1 * | 10/2003 | Hills et al. | 455/450 |
| 6,711,148 | B1 * | 3/2004 | Hills | 370/338 |
| 7,818,018 | B2 * | 10/2010 | Nanda et al. | 455/509 |
| 7,936,697 | B2 * | 5/2011 | Reza et al. | 370/252 |
| 2005/0171720 | A1 * | 8/2005 | Olson et al. | 702/121 |
| 2005/0259649 | A1 * | 11/2005 | Smith | 370/389 |
| 2006/0045048 | A1 * | 3/2006 | Kwon et al. | 370/329 |
| 2006/0067258 | A1 * | 3/2006 | Golestani et al. | 370/310 |
| 2006/0281467 | A1 * | 12/2006 | Kim et al. | 455/450 |
| 2007/0049319 | A1 * | 3/2007 | Hart et al. | 455/522 |
| 2008/0144588 | A1 * | 6/2008 | Mezer et al. | 370/338 |
| 2008/0151821 | A1 * | 6/2008 | Cho et al. | 370/329 |
| 2011/0085532 | A1 * | 4/2011 | Scherzer et al. | 370/338 |

OTHER PUBLICATIONS

Turner, J.S., "Almost All k-Colorable Graphs are Easy to Color," Journal of Algorithms, 9, 63-82, 1988.
Galinier and Hao, "Hybrid Evolutionary Algorithms for Graph Coloring," Journal of Combinatorial Optimization, 1998.
Culberson, "Iterated Greedy Graph Coloring and the Difficulty Landscape," Technical Report TR92-07.

* cited by examiner

*Primary Examiner* — Redentor Pasia
(74) *Attorney, Agent, or Firm* — Tucker Ellis LLP

(57) ABSTRACT

In an example embodiment, a topology based channel assignment method for mitigating contention between overlapping radio coverage areas in a wireless "mesh" network topology. A central controller compiles radio overlap information and executes a Tiered Graph Coloring Algorithm, which is used to mitigate contention between overlapping radio coverage areas. In general, the radio channel for each Channel Assignment Cluster (Basic Service Set) is selected so that the aggregate radio coverage area of the Channel Assignment Cluster does not overlap with the radio coverage areas of neighboring Channel Assignment Clusters and fixed interference sources. In the tiered algorithm, a Channel Assignment Cluster is represented as a single vertex, interference sources are represented as "fixed" vertices with fixed color assignments, and "overlapping" vertices are interconnected by "edges." Vertices are "tiered" so that overlap mitigation is prioritized for higher-traffic radios.

23 Claims, 6 Drawing Sheets

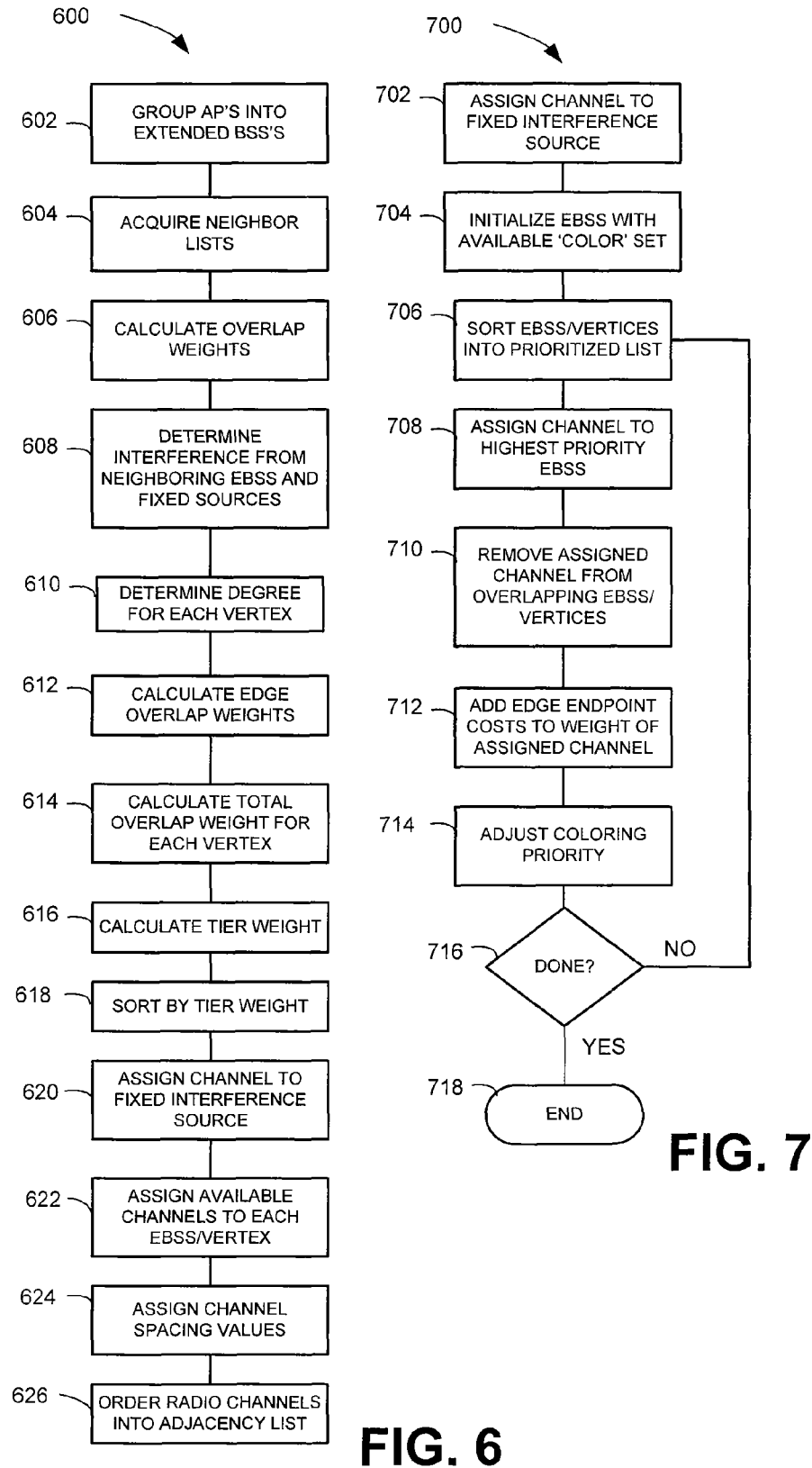

CHANNEL ASSIGNMENT PROTOCOL

TECHNICAL FIELD

The present disclosure relates generally to channel assignments for a wireless network such as backhaul channel assignments for a wireless Mesh network.

BACKGROUND

Herein, a wireless "mesh" network is comprised of 802.11 access points (APs) that are inter-connected by wireless "backhaul" radio links in a tree topology. An AP may contain 1 or more backhaul radios. The radio channel used for each AP is partially restricted by the underlying tree topology. If a child AP has a single backhaul radio, then it attaches to the spanning tree and extends the spanning tree on the same radio channel. If a parent AP changes its backhaul radio channel, for example, a child AP follows it to the new channel. If an AP has multiple backhaul radios, then a child AP can attach to its parent on a 1st radio channel and extend the spanning tree on a 2nd radio channel.

BRIEF DESCRIPTION OF THE DRAWINGS

The accompanying drawings incorporated herein and forming a part of the specification illustrate the examples embodiments.

FIG. 6 illustrates a method for compiling Channel Assignment Clusters and defining relationships between Channel Assignment Clusters and/or interference sources which may also be referred to as a channel assignment graph.

FIG. 7 illustrates an example "coloring" or channel assignment algorithm.

OVERVIEW OF EXAMPLE EMBODIMENTS

Figure 1:
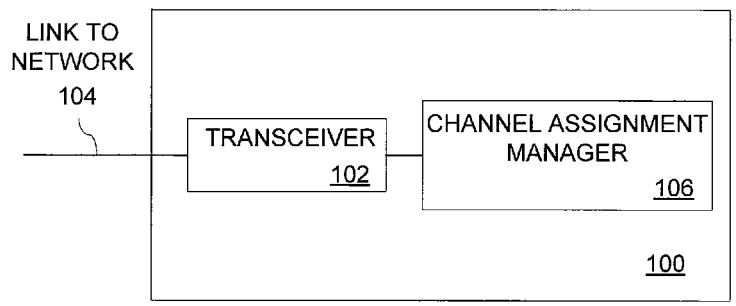
FIG. 1 illustrates an example device for performing channel assignments on a wireless network.

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with an example embodiment, there is disclosed herein an apparatus comprising a transceiver configured for sending and receiving data from wireless nodes belonging to an associated network, and a channel assignment manager comprising logic for selecting channels for the wireless nodes belonging to the associated network. The channel assignment manager is configured to compile a neighbor list based on data received from the wireless nodes. The channel assignment manager is configured to group wireless nodes sharing a common channel in a spanning sub-tree into Channel Assignment Clusters.

In accordance with an example embodiment, there is disclosed herein, a method, comprising, receiving a neighbor report from each managed wireless access point, which is in radio range, on a network. Managed access points are grouped into a plurality of Channel Assignment Clusters, wherein the plurality of Channel Assignment Clusters corresponds to a plurality of sub-trees of a spanning tree network. The method further comprises determining from the neighbor reports which of the plurality of Channel Assignment Clusters interfere with other of the plurality of Channel Assignment Clusters. The method further comprises determining the set of radio channels, one for each Channel Assignment Cluster, which minimizes interference between overlapping Channel Assignment Clusters.

DESCRIPTION OF EXAMPLE EMBODIMENTS

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described in connection with the embodiment is included in at least one embodiment described herein. The appearances of the phrase "in one embodiment" or "in one or more embodiments" in various places in the specification are not necessarily all referring to the same embodiment, nor are separate or alternative embodiments mutually exclusive of other embodiments. Features and aspects of various embodiments may be integrated into other embodiments, and embodiments illustrated in this document may be implemented without all of the features or aspects illustrated or described.

Described herein in an example embodiment is an automated channel assignment method is used to mitigate contention between neighboring radios. This method can be employed in an 802.11 "mesh" network topology. The description herein contains mentions of 'coloring' which those skilled in the art will appreciate is a term of art used in channel assignment algorithms, where a "color" corresponds to a wireless (e.g. radio) channel.

Two AP radios are "neighbors" if the respective radio coverage areas overlap on any permitted radio channel. A neighbor radio is a "visible neighbor" if it is within radio range; otherwise, it is a "hidden neighbor". In an example embodiment, each AP radio periodically transmits RRM (Radio Resource Management) Neighbor Discovery messages on a set of discrete channels. An AP can directly discover a visible neighbor when it receives a Neighbor Discovery message. Each AP periodically reports its neighbor information to a central controller, such as a LWAPP (LightWeight Access Point Protocol) controller.

A Channel Assignment Manager (CAM) in the controller compiles the neighbor radio information and executes a Channel Assignment Algorithm to select the best channel for each "managed" AP radio. Channels are selected so that contention between overlapping radio coverage areas is mitigated.

The coverage area of a radio may also overlap with the coverage area of neighboring "fixed interference sources". Fixed interference sources include non-802.11 sources, and 802.11 stations that do not belong to the network (or belong to another RRM domain). The radio channel of an interference source is considered "fixed" because it cannot be changed by the CAM for the RRM domain. APs may detect and report interference sources to the controller; and, the CAM may select channels to mitigate contention with both neighboring radios and fixed interference sources.

For purposes of channel assignment, AP radios are grouped into "disjoint" channel assignment sets. A separate instance of the channel assignment algorithm is executed for each channel assignment set. (Channel assignment sets are described in more detail, below infra.)

APs, in a single mesh network, may be configured with either multi-band or narrow-band Spanning Tree "ST" backhaul radios; however, the set of ST backhaul channels is the same for all APs. This can simplify the channel assignment logic. If the set of ST backhaul channels is uniform, in all APs, and if each channel can provide the same range, then channels can be assigned without considering the effect on the underlying spanning tree topology.

In an example embodiment, the bandwidth of select radio channels is configurable. For example, the width of a 4.9 GHz channel can be 5 MHz, 10 MHz, or 20 MHz. The maximum data rate of a channel increases in proportion to the channel width. The number of discrete channels, in a radio band, is reduced as the channel width increases. For example, the 4.9 GHz safety band can have two discrete 20-MHz-wide channels, four 10-MHz-wide discrete channels, eight 5-MHz-wide discrete channels, or a combination of 20-MHz, 10-MHz and/or 5-MHz channels. For example, one 20-MHz-wide discrete channel can be combined with two 10-MHz-wide discrete channels. In particular embodiments, higher-bandwidth channels (i.e. wider channels) are assigned to high-traffic radio links.

Multiple redundant radios, in a single AP, may cover the same physical area. If all of the redundant backhaul radios in each AP are activated then more discrete channels are required to mitigate overlap. In networks with hidden nodes, channels can be utilized more efficiently if a single Channel Coordinator controls channel access in a given radio coverage area. If the number of available discrete channels is insufficient to mitigate overlap when all redundant radios are enabled, then performance may be improved if select redundant backhaul radios are disabled.

The channel assignment algorithm determines the number of channels required to mitigate overlap in a given area. Likewise, the channel assignment algorithm determines which redundant radios should be enabled, in each AP that has is redundant radios, and determines the optimum channel widths for each radio. If the number of channels, which are required to mitigate overlap, is less than the number of available channels, in a given contention area, then two or more "narrow-width" channels can be converted to a single wider channel. For example, two adjacent 5-MHz-wide radio channels can be converted to a 10-MHz-wide channel. Redundant backhaul radios can be enabled. For example, an AP can activate two downlink public backhaul radios that cover the same physical area.

If the number of available channels is less than the number of channels required, then wide channels can be converted into multiple, narrower channels. For example, a 40-MHz channel can be converted into two 20-MHz channels, four 10-MHz channels, eight 5-MHz channels or a combination of channels such as one 20-MHz channel, one 10-MHz channel and two 5-MHz channels.

Figure 4:
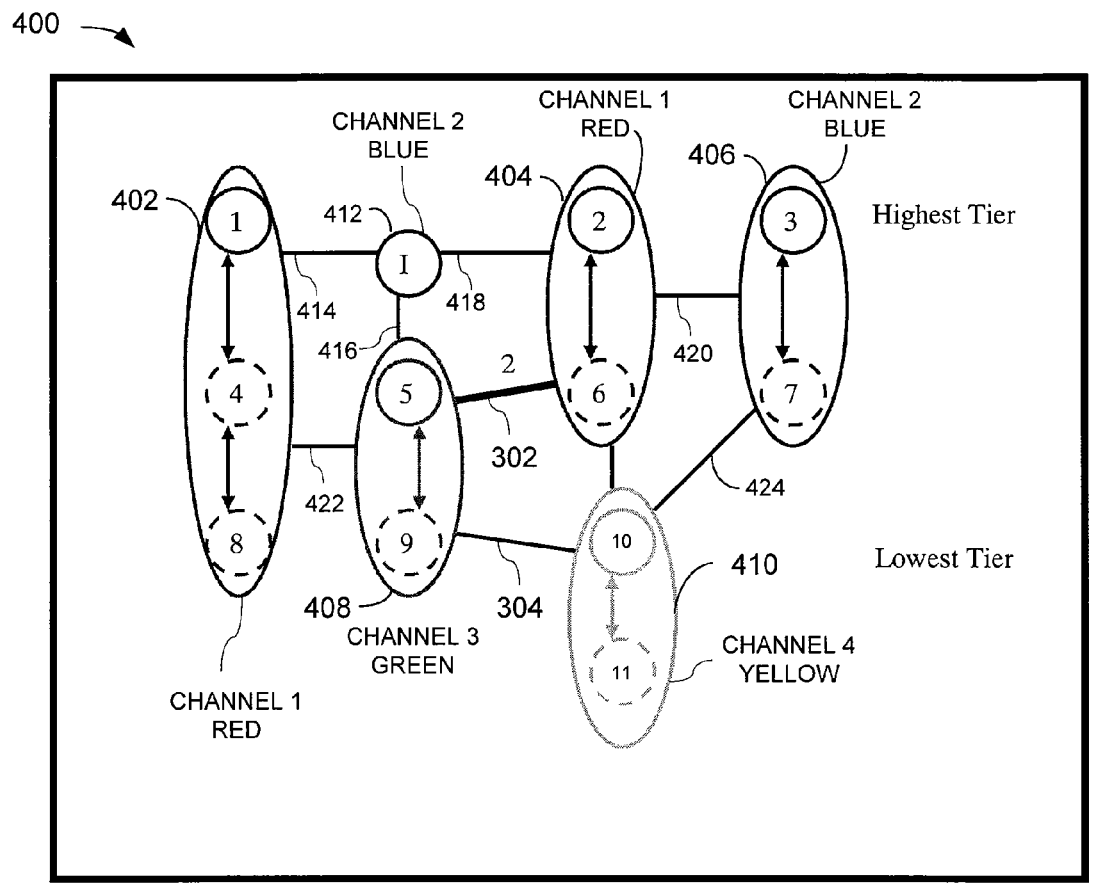
FIG. 4 illustrates an example channel assignment graph for the network illustrated in FIG. 2.

In accordance with an example embodiment, basic service sets, which are the radio coverage areas of an AP, are grouped into which is referred herein as a Channel Assignment Cluster. A Channel Assignment Cluster is a set of inter-connected BSSes that are on the same radio channel. A Channel Assignment Cluster is comprised of a single master BSS and a chain of zero or more subordinate BSSes, which are linked over a single radio channel. Each "intermediate" subordinate radio, in a Channel Assignment Cluster, belongs to the backhaul BSS of its parent and provides a backhaul BSS, for other child radios, on the same radio channel. A "leaf" subordinate radio belongs to the BSS of its parent, but does not provide a backhaul BSS. For example, in FIG. 4, radios 1, 4 and 8 comprise a Channel Assignment Cluster; radio 1 is the master radio; radio 4 is an intermediate radios; and radio 8 is a leaf radio. A Channel Assignment Cluster is a "simple BSS" if it does not contain any intermediate subordinate radios. In FIG. 4, radio 5 is the master of a simple BSS that includes a single leaf radio, i.e. radio 9. The BSSID of the master BSS is reused, as the Cluster ID, to identify the respective Channel Assignment Cluster.

Two Channel Assignment Clusters overlap if radio transmissions in the first Channel Assignment Cluster can interfere with radio transmissions in the second Channel Assignment Cluster. Channel Assignment Cluster overlap mitigation is an iterative process where:

1) An integrated neighbor AP discovery protocol enables each AP to discover its "neighbor APs" and enables NON-ROOT APs to discover a "least-cost" parent,
2) the spanning tree algorithm first establishes parent/child relationships, and the corresponding Channel Assignment Clusters, and
3) then a channel assignment algorithm is executed to minimize Channel Assignment Cluster overlap.

Referring to FIG. 1, there is illustrated a controller 100 for configured performing channel assignments on a wireless network. Controller 100 comprises a transceiver 102 for sending and receiving data from a network. Transceiver 102 may be a wireless transceiver and/or a wired (e.g. Ethernet) transceiver. Link 104 coupled transceiver 102 to the wireless network. Channel assignment manager (CAM) 106 is in communication with transceiver 106. CAM 106 can communicate (for example send and/or receive data) from the network via transceiver 102. CAM 106 comprises logic for performing channel assignments as described herein. "Logic", as used herein, includes but is not limited to hardware, firmware, software and/or combinations of each to perform a function (s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like, or combinational logic embodied in hardware. Logic may also be fully embodied as software.

Figure 2:
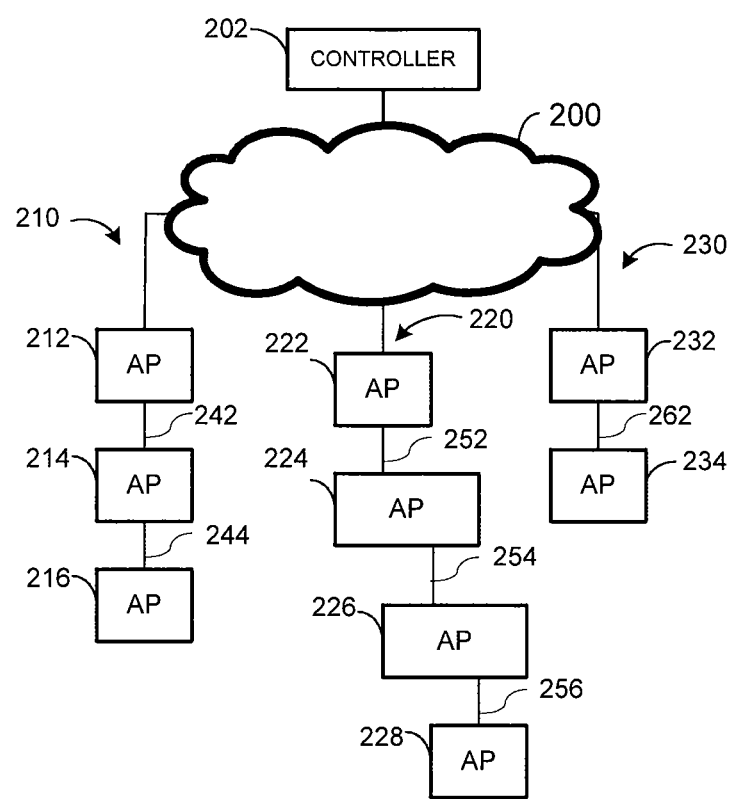
FIG. 2 illustrates an example of a wireless mesh network with spanning trees.
Figure 3:
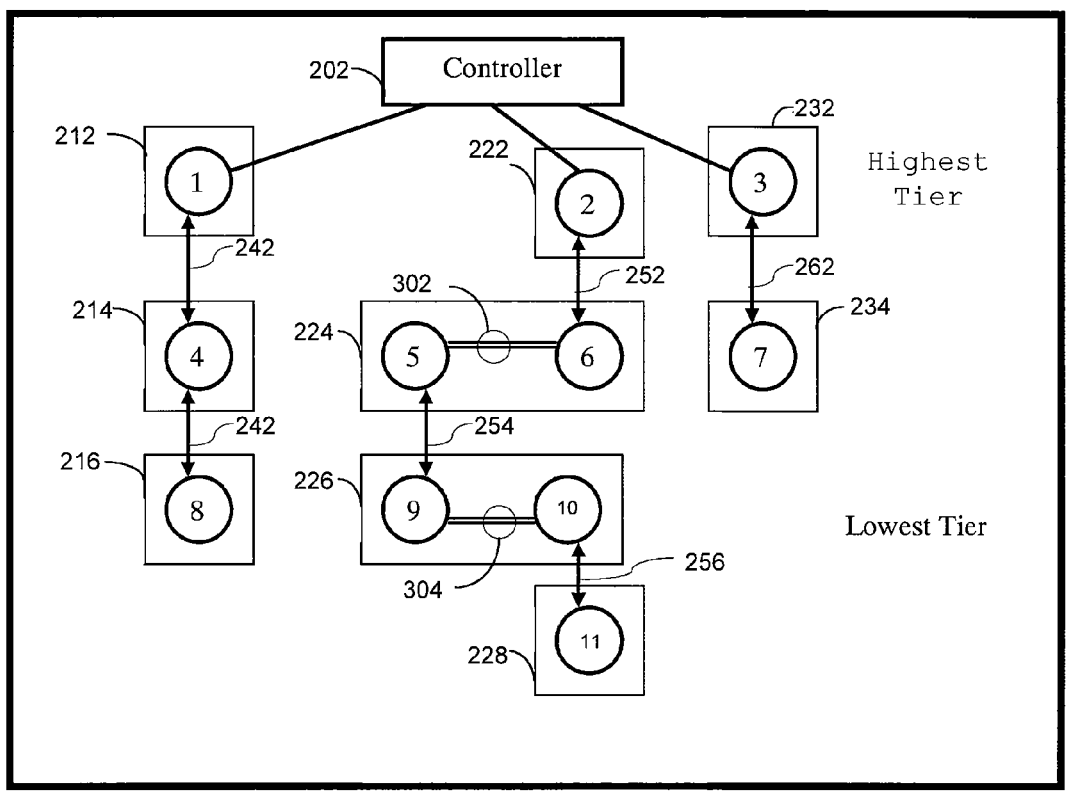
FIG. 3 illustrates an example hierarchical block diagram that includes the radios within the access points for the wireless mesh network illustrated in FIG. 2.

FIGS. 2, 3 and 4 will be employed for the purpose of illustrating an example spanning tree network to illustrate an example of the operation of a CAM such as CAM 106. FIG. 2 illustrates an example of a wireless mesh network 200 with spanning trees 210, 220, 230. AP 212 is the root for spanning tree 210, AP 222 is the root for spanning tree 220 and AP 232 is the root for spanning tree 230.

Spanning tree 210 comprises APs 212, 214 and 216. APs 212 and 214 are coupled by link 242. APs 214 and 216 are coupled by link 244.

Spanning tree 220 comprises APs 222, 224, 226 and 228. APs 222 and 224 are coupled by link 252. APs 224 and 226 are coupled by link 254. APs 226 and 228 are coupled by link 256. For purposes of illustration, in this example, APs 224 and 226 are multi-channel APs.

Spanning tree 230 comprises APs 232 and 234. APs 232 and 234 are coupled by link 262.

For purposes of illustrating this example, links 242, 244, 252, 254, 256 and 262 are wireless links. In this example, links 242, 244, 252, 254, 256 and 262 are employed for the mesh backhaul. Channel Assignment Management logic 106 performs channel assignments for links 242, 252, 254, 256 and 262. Channel Assignment Management logic is not used to select the channel for a child radio. A child radio operates on the same radio channel as its parent radio; therefore, the channel for a child radio is established when the child read selects the least-cost parent radio in the spanning tree. In FIG. 3, for example, Channel Assignment Management logic is used to select the radio channel for radio 1. Radio 4 operates on the same radio channel as its parent radio, radio 1. Likewise, radio 8 operates on the same radio channel as its parent radio, radio 4.

Referring to FIG. 3 with continued reference to FIG. 2, there is illustrated an example hierarchical block diagram that includes the radios within the access points. For example, AP 212 comprises radio 1, AP 222 comprises radio 2, AP 232 comprises radio 3, AP 214 comprises radio 4, AP 224 comprises multi-band radios 5 and 6, AP 234 comprises radio 7, AP 226 comprises multi-band radios 9 and 10, and AP 228 comprises radio 11. The double lines illustrated by 302 and 304 in AP 224 and AP 226 respectively indicate channel separation between radios 5 and 6 and between 9 and 10.

Referring to FIG. 4 with continued reference to FIGS. 2 and 3, there is illustrated a channel assignment graph 400 constructed by CAM 106 in controller 200 for the spanning tree network illustrated in FIG. 2. Ovals 402, 404, 406, 408 and 410 depict a Channel Assignment Cluster, which may also be referred to as a CA-Cluster or "vertex". Each circle 1, 2, 3, 4, 5, 6, 7, 8, 9, 10, 11 represents a radio as described in FIG. 3. The master radio for each Channel Assignment Cluster is depicted with a solid circle. Subordinate radios are depicted by dashed circles. Radio spanning tree links are depicted as arrows. Each color listed on FIG. 3 represents a different radio channel. For example, radios 1, 4, and 8 comprise a CA-Cluster of radios that operate on the same radio channel (Channel 1/or RED). Radio 1 is the master radio for the CA-Cluster. Each vertex 402, 404, 40-6, 408, 410 is identified by its master radio 1, 2, 3, 5, 10 respectively. The vertex depicted by "I" 412 represents a fixed interference source on a fixed (i.e. channel 2/blue) channel.

A solid line or "edge" between two vertices (e.g. 414, 418, 420, 422, 424, 302 and 304) depicts a (overlapping radio coverage area) "neighbor" relationship. As explained herein supra, each vertex (CA Cluster) has a degree value corresponding to the number of overlapping (neighbor) relationships. For example, vertex 5 (Radio 5 is the master) 408, for example, has a "degree" value of 4 because it has 4 neighbor vertices. The default minimum spacing value for each edge, in FIG. 4, is 1. In the illustrated example, a larger minimum spacing value of "2" is assigned to the edge between vertices 2 404 and 5 408 to indicate that the respective radio channels must be at least 2 discrete channels apart. In this example vertices 2 and 5 require minimum spacing of 2 because radios 5 and 6, which are both located on AP 224, require a minimum spacing of 2.

The generation of channel assignment graph will now be explained. Basic Service Sets (BSSes), which as used herein refers to coverage areas of wireless devices such as radios (e.g. an 802.11 compatible radio) are grouped into Channel Assignment Clusters via the existing spanning tree algorithm. A Channel Assignment Cluster corresponds to a spanning sub tree (see for example FIG. 2). The radio that is at the root of the spanning sub tree is the "master radio" for a Channel Assignment Cluster. The radio band and MAC address of the master radio identifies a Channel Assignment Cluster. Each Channel Assignment Cluster is a vertex in the channel assignment graph.

CAM 106 compiles a neighbor list. Each AP radio (e.g. 1, 2, 3, 4, 5, 6, 7, 8, 9, 10 and 11) transmits Neighbor Advertisement messages on a set of discrete radio channels, for example the set of discrete channels for the 802.11a UNI III band, is comprised of channels 149, 153, 157, 161, and 165. The set of discrete radio channels is uniform in each AP. Neighbor Advertisements are transmitted periodically and in response to a received Neighbor Probe. A radio, which is attached to a neighbor AP on a backhaul channel, periodically sends Neighbor Advertisements on each of its other unattached backhaul channels—so that other "neighbor radios" can discover the radio without going "off-channel". An attached radio may, optionally, go "off-channel" and "actively" or "passively" scan for Neighbor Advertisements on non-attached channels. In an example embodiment, a Neighbor Advertisement contains the Cluster ID and the current backhaul channel of the transmitter. To facilitate spanning tree convergence, a Neighbor Advertisement may also contain ST path cost information so that an attached NON-ROOT AP can discover the least-cost path in the ST without performing background scanning on unattached radio channels.

A radio determines its set of visible and coupled neighbors and the current serving radio channel (the radio channel used for normal data transmissions) for each visible neighbor, by monitoring received Neighbor Advertisements. When a radio receives an advertisement, the respective radio creates/updates a "coupled" neighbor entry, in its neighbor radio table, if the received advertisement contains a "matching" Cluster ID; otherwise, the radio creates/updates a "visible" entry.

At a high backhaul data rate, the interference range of a transmitter may be much greater than the data range. Therefore, a radio must transmit some RRM Neighbor Advertisements at a low data rate, where the signal-to-interference ratio is close to one, so that each AP can more accurately determine its set of neighbors.

Each radio periodically reports its Neighbor Radio List to controller 100; therefore, the controller 100 has a complete set of neighbor lists for the entire network.

An AP may also determine "hidden" neighbors. A neighbor radio is "visible" if it is within radio range; otherwise, it is "hidden". In general, a radio cannot directly discover its full set of "neighbor radios", because it cannot directly discover "hidden" neighbor radios.

For example, a mobile wireless device associated with an AP may send periodic reports of AP radios detected by the mobile wireless device. The reports may include the identification and received signal strength intensity (RSSI) for each AP radio detected. The wireless mobile node sends the report to the AP, which can examine the RSSI and if any detected AP radio exceeds a predefined RSSI, the AP can classify the detected AP as a hidden node.

As another example, each AP radio can maintain an "Overlap Help List", which is used by the controller to derive the (possibly incomplete) set of "hidden" neighbors for each radio. A first radio creates/updates an entry, in its Overlap Help List, when it receives two Neighbor Advertisements, one from each of two neighbor radios, on the same or different radio channels, within some threshold time period. Each Overlap Help List entry contains a pair of IDs, one for each of the two neighbor radios, and an "age" value that is used to indicate "freshness". For example, a node coupled to an AP may periodically report neighboring APs and signal strengths. This allows the AP to determine if any of the neighbor APs are hidden.

CAM 106 is configured to calculate an overlap weight as a function of the strength of overlap and the level of the radio in the spanning tree for each neighboring radio pair. If the overlap strength is below a Threshold Overlap Strength value then the weight is zero. Or if the spanning tree hop count of both radios is greater than a Threshold ST Hop Count value then the weight is zero. The threshold values can be modified, for example, to eliminate edges in the graph that correspond to lower cost overlap. The number of colors that are needed to color the graph can be reduced by eliminating edges. A similar method can be used to calculate the overlap weight for each neighbor pair comprised of a backhaul radio and a neighboring fixed interference source, or radio/interference pair.

CAM 106 is configured to determine the set of neighboring Channel Assignment Clusters and fixed interference sources for each Channel Assignment Cluster. A first Channel Assignment Cluster is a neighbor of a second Channel Assignment Cluster, or fixed interference source, if at least one radio in the first Channel Assignment Cluster has a non-zero overlap weight for a radio in the second Channel Assignment Cluster, or the fixed inference source. An edge connects the vertex for each Channel Assignment Cluster to the vertex for each neighboring Channel Assignment Cluster or interference source, in the channel assignment graph.

CAM 106 is further configured to calculate a degree value for each Channel Assignment Cluster (vertex). A "degree" value is equal to the number of its edges (i.e. the number of neighboring Channel Assignment Clusters and fixed interference sources).

CAM 106 is also configured to calculate an edge overlap weight as a function of the sum of weights assigned to neighbor radio pairs that span the respective Channel Assignment Clusters. The calculated weight is assigned to the edge that connects the pair of vertices in the channel assignment graph. Similarly, for each neighbor Channel Assignment Cluster and fixed interference source pair, the controller calculates the edge overlap weight as a function of the sum of weights assigned to radio/interference pairs. The calculated weight is assigned to the edge that connects the vertex for the Channel Assignment Cluster to the vertex for the interference source, in the channel assignment graph.

CAM 106 is configured to calculate a total overlap weight for each Channel Assignment Cluster (vertex). The total overlap weight is computed as the sum of the overlap weight of its edges.

CAM 106 calculates a "tier weight" value for each Channel Assignment Cluster as a function of the spanning tree level and the traffic load. In general, Channel Assignment Clusters that are closer to the spanning tree root have higher tier weights because they usually have higher traffic loads. For example, in a simple implementation radios in root APs are assigned a Load Ranking of 1, radios in 1st hop non-root APs are assigned a Load Ranking of 2, etc. The controller assigns a "tuned" Radio Load Ranking value to any radio that has operated on a channel for more than a predetermined amount of time. The controller calculates tuned Radio Load Ranking values by sorting radios based on the relative channel time usage values. Radios with higher channel usage values are assigned a higher-priority Radio Load Ranking value.

CAM 106 sorts the set of Channel Assignment Clusters by "tier weight", and splits the Channel Assignment Clusters into one or more tiers. Channel Assignment Clusters in higher tiers have a higher tier weight. For example, referring to FIG. 4, Channel Assignment Clusters 402, 404, 406 are in the highest tier, Channel Assignment Cluster 408 at the next level, and Channel Assignment Cluster 410 is the lowest tier.

CAM 106 assigns a set of available radio channels to each Channel Assignment Cluster. For example, the available "discrete" channels, for a Channel Assignment Cluster that is operating in the 802.11a UNI III band, are 149, 153, 157, 161, and 165 (which may also correspond to 'colors' in a coloring algorithm such as red, blue green yellow and orange).

CAM 106 is configured to assign a single available channel to each fixed interference source. The channel assigned to a fixed interference source is the discrete channel on which the interference was detected. Fixed interference sources include non-802.11 sources, and 802.11 stations that do not belong to the RRM domain. The radio channel of an interference source is considered "fixed" because it cannot be changed by CAM 106.

Logic in CAM 106 is configured to assign a "minimum spacing" value to each edge (radio overlap), as follows: A minimum spacing value is implicitly or explicitly assigned to each a pair of neighbor radios. The default minimum spacing value is 1 discrete radio channel. A larger minimum spacing value can be assigned to two radios that are in close proximity (e.g. in the same AP) to enforce a minimum channel separation. The minimum spacing value assigned to an edge between two vertices is the largest minimum spacing value for any pair of radios that span the respective pair of Channel Assignment Clusters. Minimum spacing values of less than one discrete channel can potentially be used to increase the number of available channels.

Logic in CAM 106 orders radio channels into an adjacency list, with higher-bandwidth channels at the start of the adjacency list. A "spacing value" may also be associated with each pair of adjacent radio channels.

Once CAM 106 has constructed the channel assignment graph, logic in CAM 106 executes the tiered channel-deficit-based channel selection (graph coloring) algorithm to select the set of AP radio channels that minimizes contention caused by overlap, an example of which will now be described. In this example, the algorithm assigns non-overlapping channels to neighboring Channel Assignment Clusters. As will be described infra, the algorithm used by CAM 106 prioritizes Channel Assignment Clusters (vertices) and assigns colors (channels) to higher priority channels (vertices) first. Thus, the algorithm is a "tiered" channel assignment algorithm. Aspects of the algorithm used by CAM 106 include (but are not limited to):

1) In a mesh network (or any spanning tree network), mitigating overlap for select Channel Assignment Clusters (e.g., BSSes closer to the spanning tree root) is more important than coloring the graph with the minimum number of colors. Therefore, the set of vertices are prioritized into one or more tiers. Colors are first assigned to Channel Assignment Clusters in higher tiers.
2) The number of available colors is bounded by the number of available radio channels. The number of available colors can be increased or decreased by splitting or combining radio channels.
3) The number of colors that are required to color a graph, within a given area, is, partially, a function of the degree of vertices. Since the number of available colors is bounded, the degree of vertices is adapted dynamically (i.e. by dynamically changing the Threshold Overlap Strength and Threshold ST Hopcount values).

4) The set of available "colors", which correspond to discrete radio channels, are ordered, as described herein.
5) In a conventional graph coloring algorithm, the "minimum spacing" value for each edge is implicitly one. In the tiered algorithm, a higher minimum spacing value can be assigned to select edges (see e.g. 302 in FIG. 4 which assigns a minimum two channel separation between radios 5 and 6 in AP 224). When a vertex is colored, the set of available colors in each neighboring vertex is reduced by the spacing value assigned to the respective edge. A "minimum spacing" value is assigned to an edge to:
A) ensure sufficient channel spacing between two radios in the same AP, and/or
B) prioritize channel assignment for select high priority radios with strong overlap.

In an example embodiment, within each tier, channel assignment is prioritized for vertices with a higher channel deficit and a higher total overlap weight, as described herein. The channel deficit for a first CA Cluster is calculated by subtracting the minimum spacing value, for each unassigned neighboring CA Cluster, from the number of remaining available channels for the first CA Cluster. A CA Cluster has a "channel surplus" if the calculated channel deficit value is a non-zero positive value. A relatively large minimum spacing value effectively prioritizes color assignment for the respective vertices. When a vertex is colored, the number of available colors in any neighboring vertices is reduced by the minimum spacing value; therefore, channel assignment is prioritized for those neighboring vertices that require relatively large minimum spacing.

If CAM 106 has not already done so while constructing the channel assignment graph, a fixed channel ("color") is assigned to each "fixed" vertex, which represents an external interference source. An interfering source that interferes on multiple channels will be assigned a fixed channel (color) for each channel that it interferes. Also, CAM 106 will initialize each vertex (Channel Assignment Cluster) initialized with an available color set that corresponds to a common set of supported radios channels (alternatively this may be performed by CAM 106 while constructing the Channel Assignment Graph).

CAM 106 calculates a coloring priority value for each vertex as a function of the number of colors (channels) in the vertex's available color (channel) set and the vertex's total overlap weight. In general, vertices that have a higher channel deficit and/or a high overlap weight have higher priority and vertices that have a channel surplus have a lower priority. The vertices in each tier are sorted by the coloring priority into a prioritized coloring list.

In an example embodiment, coloring is prioritized for vertices with the highest "Color Deficit" (e.g. the 4 of available channels is the lowest). Also, from the foregoing, vertices with a color surplus have a low coloring (assigning) priority.

CAM 106 assigns a color (channel) to the current highest priority CA Cluster (vertex). In an example embodiment, the highest-priority vertex is colored with the lowest-ordered color in its available color set. Lower-ordered colors are used first so that the distance between a selected color and any remaining unused colors is maximized (i.e. to accommodate minimum spacing requirements). If the available color set is empty, then a used color with a low weight, below a predefined threshold value, may be used to color the vertex.

In another example embodiment, local conflict avoidance is considered when assigning a color (channel). This is useful because, optionally, APs are grouped into tiers and channel assignment is prioritized for APs in higher tiers. A channel may be assigned to a first AP, in a higher tier, with multiple remaining channels, before a channel is assigned to a second neighbor AP, in a lower tier, with a single remaining channel. In that case, "local conflict avoidance" prevents the first AP from using the last remaining channel for the second AP in a lower tier.

For example, when a vertex (CA Cluster) is colored with an unused color, the vertex may have more than one unused color in its color set. A color can be selected from the unused color set that minimizes conflicts with neighboring vertices. In this context, a "conflict" occurs when an assigned color is in a small set of unused colors in a neighboring vertex. For example, consider a first vertex (CA Cluster) with two unused colors (channels) red and blue (or first channel and second channel) that is a neighbor to a second vertex (CA Cluster) that has one unused color, red (corresponding to the first channel). If the first vertex is arbitrarily colored red (assigned the first channel) then the set of unused colors (channels) in the second vertex will be exhausted. A local conflict avoidance method can be used to avoid such conflicts. Before a first vertex is colored, the set of unused colors (or low cost colors) in each neighbor vertex is examined. The color selected for the first vertex is the color that minimizes conflicts with neighboring vertices.

The color (channel) assigned by CAM 106 is removed from overlapping (neighbor) CA Clusters (vertices). Colors are removed from the available color set and added to the used color set, as required, to satisfy the minimum spacing value assigned to the respective edge. By default, only the selected color is removed from the available color set for each neighbor vertex. The "edge overlap weight", assigned to the respective edge, is added to the "cost" of the used color in each neighbor AP. An uncolored vertex cannot be assigned to a non-overlapping color if its available color set is empty. In that case, the uncolored vertex can be assigned to the lowest cost color in its used color set.

CAM 106 continues to assign channels as described above until there are no more unassigned CA Clusters. For example CAM 106 will sort unassigned CA-Cluster/vertices into a prioritized list and assign a channel (color) to the current highest priority CA Cluster, remove the color from overlapping CA Clusters, adjust edge endpoint costs and coloring priority as described herein. In networks with disjoint channels (e.g. APs having backhaul channels on different bands), CAM 106 is configured to assign channels for each band.

An example of the algorithm used by CAM 106 will now be illustrated using FIG. 4, which illustrates a channel assignment graph corresponding to the spanning tree illustrated in FIG. 2. The following assumptions are used in this example:
1) The total overlap weight of each vertex is proportional to the vertex's degree;
2) 4 available colors are ordered as follows: Red-Blue-Green-Yellow (i.e. the radio channel that corresponds to Red has the highest bandwidth), where Red=Channel 1, Blue=Channel 2, Green=Channel 3 and Yellow=Channel 4.
3) Each vertex (Channel Assignment Cluster) is identified by the ID of the master radio for the respective Channel Assignment Cluster. Vertices 1, 2, and 3 are in the first tier. Vertex 5 is in the second tier. Vertex 10 is in the third tier.

Given the above assumptions, the vertices in FIG. 4, an example embodiment of methodology 700 assigns channels to Channel Assignment Clusters (or colors the vertices) as follows:
1) Vertex "I" 412, represents a fixed interference source on a fixed channel (Blue/Channel 2); therefore, vertex 412 is initially colored blue (channel 2). Blue is moved from the available color set to the used color set in neighboring vertices 1, 2, and 5 (402, 404 and 408 respectively).

2) The channel deficit or surplus for each vertex is calculated and vertices are sorted into a prioritized coloring list based on the channel deficit and tier. Vertex 2 404 is selected first because it the vertex in the highest tier with the highest channel deficit. (The channel deficit value for Vertex 2 is 0. It is calculated by subtracting the minimum spacing values, for all of its edges, from its number of available colors.) Vertex 2 404 is colored Red (channel 1)—the lowest-ordered color in the set of available colors. A channel change protocol is used to move radio 6 to the same (i.e. Red) channel as radio 2. The channel change protocol may be any suitable protocol. Red (Channel 1) is moved from the available color set to the used color set in neighboring vertices 3, 5, and 10 (406, 408, and 410 respectively). Blue (Channel 2) is also removed from the set of available colors for Vertex 5 408, since radios 5 and 6 must be separated by at least 2 colors. Blue would also be removed for Vertex 5 because of edge 416 from interfering source 412.

3) Vertex 3 406 is selected next, from the set of uncolored vertices in the highest tier, because it has the highest total overlap weight. Vertex 3 is colored Blue, the lowest-ordered non-overlapping available color. The channel change protocol is used to move radio 7 to the same channel. Blue is moved from the available color set to the used color set in neighboring vertices 2 and 10 (404 and 410).

4) Vertex 1 402 is colored next. Vertex 1 is colored Red (Channel 1), the lowest-ordered non-overlapping available color. The channel change protocol is used to move radios 4 and 8 to the same channel.

5) Vertex 5 408, in tier 2, is colored next. Vertex 5 408 is colored Green (Channel 3), the lowest-ordered available color in vertex 5's color palette. The channel change protocol is used to move radio 9 to the same channel.

6) Finally, Vertex 10 410, in tier 3, is colored Yellow, the lowest-ordered available color. The channel change protocol is used to move radio 11 to the same channel.

In an example embodiment, the channel change protocol compatible with the method specified in the IEEE 802.11h standard (2003) is used to move all of the radios, in a Channel Assignment Cluster, to a new channel. When the controller first assigns a new channel to the master radio, the master radio immediately generates a Channel Switch Announcement. Likewise, when a child NON-ROOT AP first receives a Channel Switch Announcement, from its parent, it immediately generates a channel switch announcement. A Channel Switch Announcement includes the new channel ID and a "count" value that indicates the number of remaining beacon periods before the channel change. A radio includes a Channel Switch Announcement element, in its scheduled beacons, when a channel switch is pending. For radios that do not send beacons, an announcement can be sent that identifies when to switch to the new channel, such as by specifying a time interval or a time when the change will occur.

In accordance with an example embodiment, CAM 106 adapts the number of available channels and/or the number of overlapping Channel Assignment Clusters to match the number of channels required for mitigating overlap contention. CAM 106 determines the number of channels required to mitigate overlap. CAM 106 then compares number of channels required to the number of channels available. If the number of available channels is equal to the number of required channels, CAM 106 takes no further action.

If the number of available channels is less than the number of required channels, CAM 106 may employ one or more methods to either increase or decrease the number of required channels and/or increase the number of available channels. For example, radio overlap weights can be adjusted to reduce the number of overlapping Channel Assignment Clusters (or edges on the graph). For example, a radio overlap that is below a threshold signal strength can be ignored, thus adjusting the threshold will adjust the radio overlap weight. Thus, a radio overlap that occurs below the adjusted threshold level in the spanning tree can be ignored. In an example embodiment, a wide channel can be split into two or more narrow channels (for example a 40-MHz channel can be split into two 20-MHz channels or four 10-MHz channels, etc.). In an example embodiment, the number of available channels can be increased by decreasing the spacing (separation) between channels at select locations. In an example embodiment, if an AP has multiple enabled radios, which redundantly cover the same physical area, then one of the redundant radios may be disabled.

If the number of available channels is greater than the number of required channels, CAM 106 may employ one or more methods to increase the available bandwidth at select locations. For example, two narrow band (e.g. 5-MHz) channels can be combined into a wider (e.g. 10-MHz) channel. In an example embodiment, if an AP has a disabled redundant radio, which covers the same physical area as an enabled radio on the AP, then the redundant radio may be enabled.

When the CAM assigns a color (channel) to a first CA Cluster, then, in each neighbor CA Cluster, the color is moved from the available color set to the used color set and cost of the color is incremented. The CAM cannot assign an uncolored CA Cluster to a non-overlapping color (channel) if its available color set is empty. If the CAM cannot assign a CA Cluster to a non-overlapping channel, then the CAM may assign the CA Cluster to the lowest cost color in its used color set.

Figure 5:
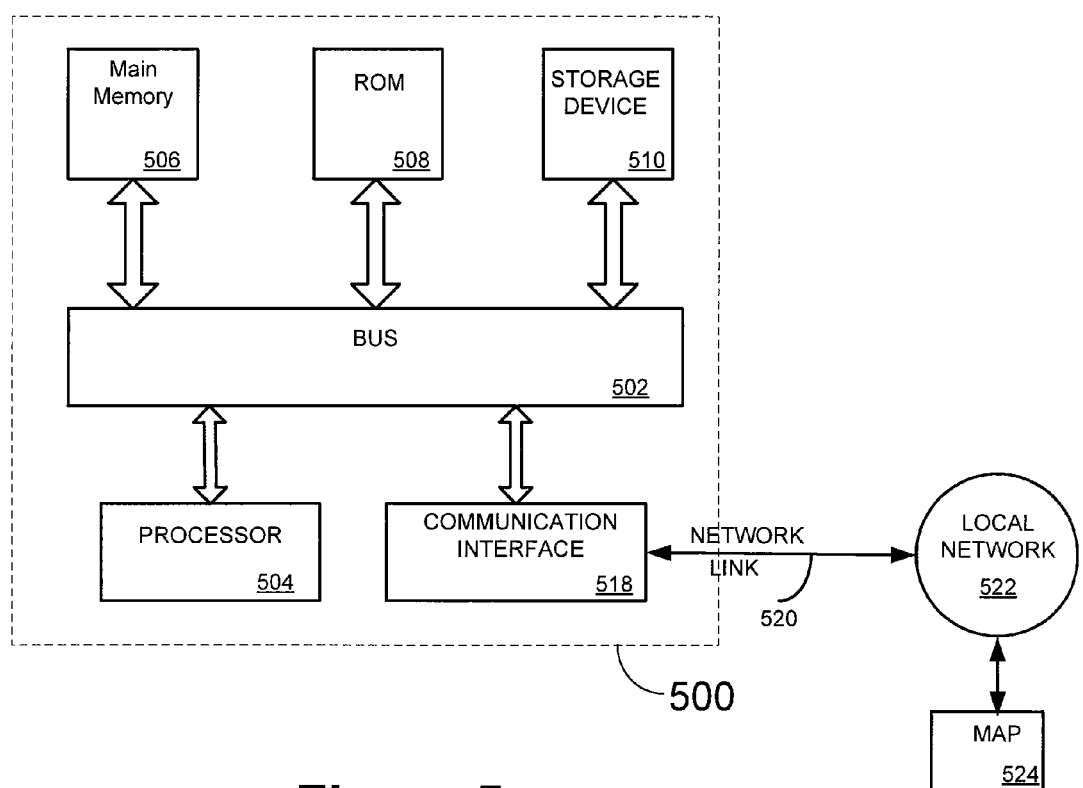
FIG. 5 is a block diagram that illustrates a computer system upon which an example embodiment may be implemented.

FIG. 5 is a block diagram that illustrates a computer system 500 upon which an example embodiment may be implemented. Computer system 500 includes a bus 502 or other communication mechanism for communicating information and a processor 504 coupled with bus 502 for processing information. Computer system 500 also includes a main memory 506, such as random access memory (RAM) or other dynamic storage device coupled to bus 502 for storing information and instructions to be executed by processor 504. Main memory 506 also may be used for storing a temporary variable or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

An aspect of the example embodiment is related to the use of computer system 500 for implementing a channel assignment protocol to mitigate contention between overlapping radio coverage areas. According to an example embodiment, the channel assignment protocol is provided by computer system 500 in response to processor 504 executing one or more sequences of one or more instructions contained in main memory 506. Such instructions may be read into main memory 506 from another computer-readable medium, such as storage device 510. Execution of the sequence of instructions contained in main memory 506 causes processor 504 to perform the process steps described herein. One or more processors in a multi-processing arrangement may also be employed to execute the sequences of instructions contained in main memory 506. In alternative embodiments, hard-wired circuitry may be used in place of or in combination with software instructions to implement an example embodiment. Thus, embodiments described herein are not limited to any specific combination of hardware circuitry and software.

The term "computer-readable medium" as used herein refers to any medium that participates in providing instructions to processor 504 for execution. Such a medium may take many forms, including but not limited to non-volatile media, volatile media, and transmission media. Non-volatile media include for example optical or magnetic disks, such as storage device 510. Volatile media include dynamic memory such as main memory 506. Transmission media include coaxial cables, copper wire and fiber optics, including the wires that comprise bus 502. Transmission media can also take the form of acoustic or light waves such as those generated during radio frequency (RF) and infrared (IR) data communications. Common forms of computer-readable media include for example floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read.

Various forms of computer-readable media may be involved in carrying one or more sequences of one or more instructions to processor 504 for execution. For example, the instructions may initially be borne on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector coupled to bus 502 can receive the data carried in the infrared signal and place the data on bus 502. Bus 502 carries the data to main memory 506 from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling computer system 500 to a network link 520 that is connected to a local network 522. For example, communication interface 518 may be a local area network (LAN) card to provide a data communication connection to a compatible LAN. As another example, communication interface 518 may be an integrated services digital network (ISDN) card or a modem to provide a data communication connection to a corresponding type of telephone line. Wireless links may also be implemented. In any such implementation, communication interface 518 sends and receives electrical, electromagnetic, or optical signals that carry digital data streams representing various types of information.

Network link 520 typically provides data communication through one or more networks to other data devices. For example, network link 520 may provide a connection through local network 522 to communicate with other devices such as Mesh Access Point (NON-ROOT AP) 524.

Computer system 500 can send messages and receive data, including program codes, through the network(s), network link 520, and communication interface 518. In the Internet example, a server 530 might transmit a requested code for an application program through Internet 528, ISP 526, local network 522, and communication interface 518. In accordance with an example embodiment, one such downloaded application provides for the channel assignment protocol as described herein.

Figure 8:
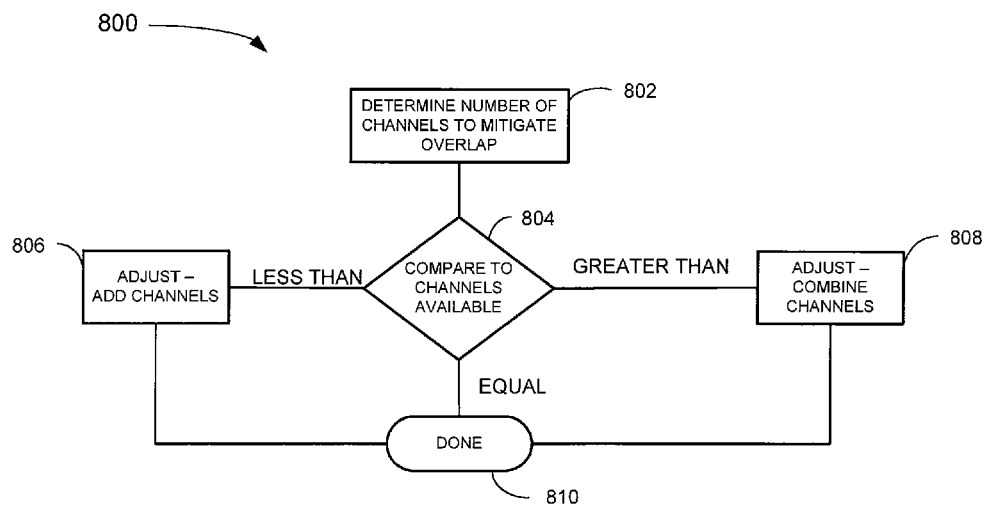
FIG. 8 illustrates an example method that adapts the number of available channels and/or the number of overlapping Channel Assignment Clusters.

In view of the foregoing structural and functional features described above, methodologies in accordance with example embodiments will be better appreciated with reference to FIGS. 6, 7, and 8. While for purposes of simplicity of explanation the methodologies of FIGS. 6, 7, and 8 are shown and described as executing serially, it is to be understood and appreciated that the example embodiments are not limited by the illustrated order, as some aspects could occur in different orders and/or concurrently with other aspects from that shown and described herein. Moreover, not all illustrated features may be required to implement an example embodiment. The methodologies described herein are suitably adapted to be implemented in hardware, software, or a combination thereof.

Referring to FIG. 6, there is illustrated a methodology 600 for compiling Channel Assignment Clusters and defining the relationships between basic service sets and/or interference sources which may also be referred to as "channel assignment graph" for a wireless network, such as a mesh network. As will be explained below, the channel access graph generated by methodology 600 is used to assign channels to mitigate contention between overlapping radio coverage areas. In an example embodiment, methodology 600 is performed by a channel assignment manager which may be located within a device on a network infrastructure or co-located within one of the managed nodes on the wireless network.

At 602, BSSes are grouped into Channel Assignment Clusters via the existing spanning tree algorithm. A Channel Assignment Cluster corresponds to a spanning sub tree (see for example FIG. 2). The radio that is at the root of the spanning sub tree is the "master radio" for a Channel Assignment Cluster. The radio band and MAC address of the master radio identifies a Channel Assignment Cluster. Each Channel Assignment Cluster is a vertex in the channel assignment graph.

At 604, a neighbor list is compiled. Each AP radio transmits Neighbor Advertisement messages on a set of discrete radio channels, for example the set of discrete channels for the 802.11a UNI III band, is comprised of channels 149, 153, 157, 161, and 165. The set of discrete radio channels must be uniform in each AP. Neighbor Advertisements are transmitted periodically and in response to a received Neighbor Probe. A radio, which is attached to a neighbor AP on a backhaul channel, periodically sends Neighbor Advertisements on each of its other unattached backhaul channels—so that other "neighbor radios" can discover the radio without going "off-channel". An attached radio may, optionally, go "off-channel" and "actively" or "passively" scan for Neighbor Advertisements on non-attached channels.

In an example embodiment, a Neighbor Advertisement contains the Channel Assignment Cluster Identifier and the current backhaul channel of the transmitter. To facilitate spanning tree convergence, a Neighbor Advertisement may also contain ST path cost information so that an attached NON-ROOT AP can discover the least-cost path in the ST without performing background scanning on unattached radio channels.

A radio determines its set of visible and coupled neighbors, and the current serving radio channel for each visible neighbor, by monitoring received Neighbor Advertisements. When a radio receives an advertisement, the respective radio creates/updates a "coupled" neighbor entry, in its neighbor radio table, if the received advertisement contains a "matching" Cluster-ID; otherwise, the radio creates/updates a "visible" entry.

At a high backhaul data rate, the interference range of a transmitter may be much greater than the data range. Therefore, a radio must transmit some RRM Neighbor Advertisements at a low data rate, where the signal-to-interference ratio is close to one, so that each AP can more accurately determine its set of neighbors.

Each radio periodically reports its Neighbor Radio List to the controller; therefore, the controller has a complete set of neighbor lists for the entire network.

An AP may also determine "hidden" neighbors. A neighbor radio is "visible" if it is within radio range; otherwise, it is "hidden". In general, a radio cannot directly discover its full set of "neighbor radios", because it cannot directly discover "hidden" neighbor radios.

For example, a mobile wireless device associated with an AP may send periodic reports of APs detected by the mobile wireless device. The reports may include the identification and received signal strength intensity (RSSI) for each AP detected. The wireless mobile node sends the report to the AP, which can examine the RSSI and if any detected AP exceeds a predefined RSSI, the AP can classify the detected AP as a hidden node.

As another example, each AP radio can maintain an "Overlap Help List", which is used by the controller to derive the (possibly incomplete) set of "hidden" neighbors for each radio. A first radio creates/updates an entry, in its Overlap Help List, when it receives two Neighbor Advertisements, one from each of two neighbor radios, on the same or different radio channels, within some threshold time period. Each Overlap Help List entry contains a pair of IDs, one for each of the two neighbor radios, and an "age" value that is used to indicate "freshness". For example, a node coupled to an AP may periodically report neighboring APs and signal strengths. This allows the AP to determine if any of the neighbor APs are hidden.

At 606, the controller calculates the overlap weight as a function of the strength of overlap and the level of the radio in the spanning tree for each neighboring radio pair. If the overlap strength is below a Threshold Overlap Strength value then the weight is zero. Or if the spanning tree hop count of both radios is greater than a Threshold ST Hop Count value then the weight is zero. The threshold values can be modified, for example, to eliminate edges in the graph that correspond to lower cost overlap. The number of colors that are needed to color the graph can be reduced by eliminating edges. A large overlap weight is assigned to a pair of radios that are contained in the same AP and operate in the same radio band. A similar method can be used to calculate the overlap weight for each neighbor pair comprised of a backhaul radio and a neighboring fixed interference source, or radio/interference pair.

At 608, the controller determines the set of neighboring Channel Assignment Clusters and fixed interference sources for each Channel Assignment Cluster. A first Channel Assignment Cluster is a neighbor of a second Channel Assignment Cluster, or fixed interference source, if at least one radio in the first Channel Assignment Cluster has a non-zero overlap weight for a radio in the second Channel Assignment Cluster, or the fixed inference source. An edge connects the vertex for each Channel Assignment Cluster to the vertex for each neighboring Channel Assignment Cluster or interference source, in the channel assignment graph.

At 610, a degree value is calculated for each Channel Assignment Cluster (vertex). A "degree" value is equal to the number of its edges (i.e. the number of neighboring Channel Assignment Clusters and fixed interference sources).

At 612, the controller calculates an edge overlap weight as a function of the sum of weights assigned to neighbor radio pairs that span the respective Channel Assignment Clusters. The calculated weight is assigned to the edge that connects the pair of vertices in the channel assignment graph. Similarly, for each neighbor Channel Assignment Cluster and fixed interference source pair, the controller calculates the edge overlap weight as a function of the sum of weights assigned to radio/interference pairs. The calculated weight is assigned to the edge that connects the vertex for the Channel Assignment Cluster to the vertex for the interference source, in the channel assignment graph.

At 614, the controller calculates a total overlap weight for each Channel Assignment Cluster (vertex). The total overlap weight is computed as the sum of the overlap weight of its edges.

At 616, the controller calculates a "tier weight" value for each Channel Assignment Cluster as a function of the spanning tree level and the traffic load. In general, Channel Assignment Clusters that are closer to the spanning tree root have higher tier weights because they usually have higher traffic loads. For example, in a simple implementation radios in RAPs are assigned a Load Ranking of 1, radios in 1st hop NON-ROOT APs are assigned a Load Ranking of 2, etc. The controller assigns a "tuned" Radio Load Ranking value to any radio that has a uses the channel for more than a predetermined amount of time. The controller calculates tuned Radio Load Ranking values by sorting radios based on the relative channel time usage values. Radios with higher channel usage values are assigned a higher-priority Radio Load Ranking value.

At 618, The set of Channel Assignment Clusters is sorted, by "tier weight", and split into one or more tiers. Channel Assignment Clusters in higher tiers have a higher tier weight. For example, referring to FIG. 4, Channel Assignment Clusters 402, 404, 406 are in the highest tier, Channel Assignment Cluster 408 at the next level, and Channel Assignment Cluster 410 is the lowest tier.

At 620, a set of available radio channels is assigned to each Channel Assignment Cluster. For example, the available "discrete" channels, for a Channel Assignment Cluster that is operating in the 802.11a UNI III band, are 149, 153, 157, 161, and 165. Each AP only performs neighbor discovery on its assigned discrete channels.

At 622, the controller assigns single available channel to each fixed interference source. The channel assigned to a fixed interference source is the discrete channel on which the interference was detected. Fixed interference sources include non-802.11 sources, and 802.11 stations that do not belong to the RRM domain. The radio channel of an interference source is considered "fixed" because it cannot be changed by the CAM for the RRM domain.

At 624, a "minimum spacing" value is assigned to each edge (radio overlap), as follows: A minimum spacing value is implicitly or explicitly assigned to each a pair of neighbor radios. The default minimum spacing value is 1 discrete radio channel. A larger minimum spacing value can be assigned to two radios that are in close proximity (e.g. in the same AP) to enforce a minimum channel separation. The minimum spacing value assigned to an edge between two vertices is the largest minimum spacing value for any pair of radios that span the respective pair of Channel Assignment Clusters. Minimum spacing values of less than one discrete channel can potentially be used to increase the number of available channels. For example, for a UNI III band radio, a 40-MHz band can be split into two 20-MHz, four 10-MHz, eight 5-MHz band and/or a combination of 20-MHz, 10 MHz and/or 5 MHz bands that equal 40-MHz. Thus, if 10-MHz of separation is required, a 40-MHz radio can be reconfigured to use 10-MHz and/or 5-MHz bands.

At 626, radio channels are ordered into an adjacency list, with higher-bandwidth channels at the start of the adjacency list. A "spacing value" is associated with each pair of adjacent radio channels.

Once the controller has constructed the channel assignment graph, the controller executes the tiered channel selection (graph coloring) algorithm to select the set of AP radio channels that minimizes contention caused by overlap.

FIG. 7 illustrates an example "coloring" or channel assignment algorithm 700. Algorithm 700 is used to assign non-overlapping channels to neighboring Channel Assignment Clusters. As will be described infra, algorithm 700 prioritizes CA Clusters (vertices) and assigns colors (channels) to higher priority channels (vertices) first. Thus, algorithm 700 is a "tiered" channel assignment algorithm. Aspects of algorithm 700 include (but are not limited to):

1) In a mesh network, mitigating overlap for select Channel Assignment Clusters (e.g. BSSes closer to the spanning tree root) is more important than coloring the graph with the minimum number of colors. Therefore, the set of vertices are prioritized into one or more tiers. Colors are first assigned to Channel Assignment Clusters in higher tiers.
2) The number of available colors is bounded by the number of available radio channels. The number of available colors can be increased or decreased by splitting or combining radio channels.
3) The number of colors that are required to color a graph, within a given area, is, partially, a function of the degree of vertices. Since the number of available colors is bounded, the degree of vertices is adapted dynamically (i.e. by dynamically changing the Threshold Overlap Strength and Threshold ST Hopcount values).
4) The set of available "colors", which correspond to discrete radio channels, are ordered, as described herein.
5) In a conventional graph coloring algorithm, the "minimum spacing" value for each edge is implicitly one. In the tiered algorithm, a higher minimum spacing value can be assigned to select edges (see e.g. 302 in FIG. 4 which assigns a two channel separation between radios 5 and 6 in AP 224). When a vertex is colored, the set of available colors in each neighboring vertex is reduced by the spacing value assigned to the respective edge. A "minimum spacing" value assigned to an edge to:
   A) ensure sufficient channel spacing between two radios in the same AP, and/or
   B) prioritize channel assignment for select high priority radios with strong overlap.

In an example embodiment, within each tier, channel assignment is prioritized for vertices with a lower number of remaining colors and a higher total overlap weight, as described herein. A relatively large minimum spacing value effectively prioritizes color assignment for the respective vertices. A large "edge overlap weight" is assigned to an edge between two vertices where overlap occurs between two radios in the same AP. When a vertex is colored, the number of available colors in any neighboring vertices is reduced by the minimum spacing value; therefore, channel assignment is prioritized for those neighboring vertices that require relatively large minimum spacing.

At 702, a fixed channel ("color") is assigned to each "fixed" vertex, which represents an external interference source. An interfering source that interferes on multiple channels will be assigned a fixed channel (color) for each channel that it interferes. This step may be performed while defining relationships between Channel Assignment Clusters and fixed interference sources (e.g. while generating a graph assignment graph) as described in step 620 (FIG. 6).

At 704, Each vertex (Channel Assignment Cluster) is initialized with an available color set that corresponds to a common set of supported radios channels. Each vertex is also initialized with an empty used color set. The weight of each color is initialized to zero. This step may be performed while defining relationships between Channel Assignment Clusters and fixed interference sources (e.g. while generating a graph assignment graph) as described in step 622 (FIG. 6).

At 706, a coloring priority value is calculated for each vertex as a function of the number of colors (channels) in the vertex's available color (channel)set and the vertex's total overlap weight. In general, vertices that have a small number of available colors and/or a high overlap weight have higher priority. The vertices in each tier are sorted by the coloring priority into a prioritized coloring list.

In an example embodiment, coloring is prioritized for vertices with the highest "Color Deficit". The color deficit is defined as:

Color_Deficit=Total_Minimum_Spacing_of_Uncolored Neighbors—Number_of_Unused_Colors.

A vertex has a "color surplus" if it has more unused colors (channels) than uncolored (unassigned) neighbors; otherwise it has a channel deficit. Also, from the foregoing, vertices with a color surplus have a low coloring (assigning) priority.

At 708, a color (channel) is assigned to the current highest priority CA Cluster (vertex). In an example embodiment, the highest-priority vertex is colored with the lowest-ordered color in its available color set. Lower-ordered colors are used first so that the distance between a selected color and any remaining unused colors is maximized (i.e. to accommodate minimum spacing requirements). If the available color set is empty, then a used color with a low weight, below a pre-defined threshold value, may be used to color the vertex.

In another example embodiment, local conflict avoidance is considered when assigning a color (channel). This is useful because, optionally, APs are grouped into tiers and channel assignment is prioritized for APs in higher tiers. A channel may assigned to a first AP, in a higher tier, with multiple remaining channels, before a channel is assigned to a second neighbor AP, in a lower tier, with a single remaining channel. In that case, "local conflict avoidance" prevents the first AP from using the last remaining channel for the second AP in a lower tier.

For example, when a vertex (CA Cluster) is colored with an unused color, the vertex may have more than one unused color in its color set. A color can be selected from the unused color set that minimizes conflicts with neighboring vertices. In this context, a "conflict" occurs when an assigned color is in a small set of unused colors in a neighboring vertex. For example, consider a first vertex (CA Cluster) with two unused colors (channels) red and blue (or first channel and second channel) that is a neighbor to a second vertex (CA Cluster) that has one unused color, red (corresponding to the first channel). If the first vertex is arbitrarily colored red (assigned the first channel) then the set of unused colors (channels) in the second vertex will be exhausted. A local conflict avoidance method can be used to avoid such conflicts. Before a first vertex is colored, the set of unused colors (or low cost colors) in each neighbor vertex is examined. The color selected for the first vertex is the color that minimizes conflicts with neighboring vertices.

At 710, the color (channel) assigned in 708 is removed from overlapping (neighbor) CA Clusters (vertices). Colors are removed from the available color set and added to the used color set, as required, to satisfy the minimum spacing value assigned to the respective edge. By default, only the selected color is removed from the available color set for each neighbor vertex. At 712, the "edge overlap weight", assigned to the respective edge, is added to the weight of the used color. At 714, the coloring (assigning) priority for the assigned color (channel) is adjusted for the color that was assigned in 708.

At 716 the process repeats as needed. If there are more unassigned CA Clusters (NO), 706, 708, 710, 712, 714 are repeated; otherwise (YES) all CA Clusters are assigned channels and the algorithm is done and stops at 718. In networks with disjoint channels (e.g. APs having backhaul channels on different bands), methodologies 600 and 700 can be employed to assign channels for each band.

An example of methodology 700 will now be illustrated. FIG. 4 illustrates a channel assignment graph corresponding to the spanning tree illustrated in FIG. 2. The following assumptions are used in this example:
1) The total overlap weight of each vertex is proportional to the vertex's degree;
2) 4 available colors are ordered as follows: Red-Blue-Green-Yellow (i.e. the radio channel that corresponds to Red has the highest bandwidth), where Red=Channel 1, Blue=Channel 2, Green=Channel 3 and Yellow=Channel 4.
3) Each vertex (Channel Assignment Cluster) is identified by the ID of the master radio for the respective Channel Assignment Cluster. Vertices 1, 2, and 3 are in the first tier. Vertex 5 is in the second tier. Vertex 10 is in the third tier.

Given the above assumptions, the vertices in FIG. 4, an example embodiment of methodology 700 assigns channels to Channel Assignment Clusters (or colors the vertices) as follows:
1) Vertex "I" 412, represents a fixed interference source on a fixed channel (Blue/Channel 2); therefore, vertex 412 is initially colored blue (channel 2). Blue is moved from the available color set to the used color set in neighboring vertices 1, 2, and 5 (402, 404 and 408 respectively).
2) Vertex 2 404 is selected first, from the set of vertices in the highest tier with the fewest available colors, because it has the highest total overlap weight. Vertex 2 404 is colored Red (channel 1)—the lowest-ordered color in the set of available colors. A channel change protocol is used to move radio 6 to the same (i.e. Red) channel as radio 2. The channel change protocol may be any suitable protocol. Red (Channel 1) is moved from the available color set to the used color set in neighboring vertices 3, 5, and 10 (406, 408, and 410 respectively). Blue (Channel 2) is also removed from the set of available colors for Vertex 5 408, since radios 5 and 6 must be separated by at least 2 colors. Blue would also be removed for Vertex 5 because of edge 416 from interfering source 412.
3) Vertex 3 406 is selected next, from the set of uncolored vertices in the highest tier with the fewest available colors, because it has the highest total overlap weight. Vertex 3 is colored Blue, the lowest-ordered non-overlapping available color. The channel change protocol is used to move radio 7 to the same channel. Blue is moved from the available color set to the used color set in neighboring vertices 2 and 10 (404 and 410).
4) Vertex 1 402 is colored next. Vertex 1 is colored Red (Channel 1), the lowest-ordered non-overlapping available color. The channel change protocol is used to move radios 4 and 8 to the same channel.
5) Vertex 5 408, in tier 2, is colored next. Vertex 5 408 is colored Green (Channel 3), the lowest-ordered available color in vertex 5's color palette. The channel change protocol is used to move radio 9 to the same channel.
6) Finally, Vertex 10 410, in tier 3, is colored Yellow, the lowest-ordered available color. The channel change protocol is used to move radio 11 to the same channel.

In an example embodiment, the channel change protocol compatible with the method specified in the IEEE 802.11h standard (2003) is used to move all of the radios, in a Channel Assignment Cluster, to a new channel. When the controller first assigns a new channel to the master radio, the master radio immediately generates a Channel Switch Announcement. Likewise, when a child NON-ROOT AP first receives a Channel Switch Announcement, from its parent, it immediately generates a channel switch announcement. A Channel Switch Announcement includes the new channel ID and a "count" value that indicates the number of remaining beacon periods before the channel change. A radio includes a Channel Switch Announcement element, in its scheduled beacons, when a channel switch is pending. For radios that do not send beacons, an announcement can be sent that identifies when to switch to the new channel, such as by specifying a time interval or a time when the change will occur.

FIG. 8 illustrates an example method 800 that adapts the number of channels and/or the number of overlapping Channel Assignment Clusters. At 800 the channel assignment manager determines the number of channels required to mitigate overlap. At 804 the number of channels required is compared to the number of channels available.

If, at 804, the number of available channels is less than the number of required channels (LESS THAN), at 806 one or more methods are used to either decrease the number of required channels and/or increase the number of available channels. For example, radio overlap weights can be adjusted to reduce the number of overlapping Channel Assignment Clusters (or edges on the graph). For example, a radio overlap that is below a threshold signal strength can be ignored. So by increasing the threshold to a new threshold, a radio overlap that occurs below threshold level in the spanning tree can be ignored. In an example embodiment, a wide channel can be split into two or more narrow channels (for example a 40-MHz channel can be split into two 20-MHz channels or four 10-MHz channels, etc.). In an example embodiment, the number of available channels can be increased by decreasing the spacing (separation) between channels at select locations. In an example embodiment, if an AP has multiple enabled radios, which redundantly cover the same physical area, then one of the redundant radios may be disabled. Once the number of available channels is equal to the number of required channels method 800 completes as illustrated at 810.

If at 804 the number of available channels is greater than the number of required channels (GREATER THAN), at 808 one or more methods can be used to increase the available bandwidth at select locations. For example, two narrow band (e.g. 5-MHz) channels can be combined into a wider (e.g. 10-MHz) channel. In an example embodiment, if an AP has a disabled redundant radio, which covers the same physical area as an enabled radio on the AP, then the redundant radio may be enabled. Once the number of available channels is equal to the number of required channels method 800 completes as illustrated at 810.

If at 804 the number of available channels is equal to the number of required channels (EQUAL) then no action needs to be taken. Because no adjustment is needed for the number of available channels, at 810 method 800 completes.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications and variations that fall within the spirit and scope of the appended claims interpreted in accordance with the breadth to which they are fairly, legally and equitably entitled.

The invention claimed is:

1. An apparatus, comprising:
    a transceiver configured for sending and receiving data from wireless nodes belonging to an associated network; and
    a channel assignment manager comprising logic for selecting channels for the wireless nodes belonging to the associated network;
    wherein the channel assignment manager is configured to compile a neighbor list based on data received from the wireless nodes;
    wherein the channel assignment manager is configured to group wireless nodes sharing a common channel in a spanning sub-tree of a spanning tree into Channel Assignment Clusters;
    wherein the channel assignment manager is configured to determine from data received from the wireless nodes, via the transceiver, overlapping coverage areas between the Channel Assignment Clusters;
    wherein the channel assignment manager is configured to determine an overlap weight for a Channel Assignment Cluster;
    wherein an overlap weight is based on strength of overlap and a level in the spanning tree; and,
    wherein the channel assignment manager is configured to determine a tier weight for the Channel Assignment Clusters, wherein the tier weight is based on the level in the spanning tree and a traffic load based on relative channel time usage values of radios of the Channel Assignment Clusters.

2. The apparatus according to claim 1, wherein the channel assignment manager is configured to assign a channel for a fixed interference source corresponding to a channel that the fixed interference source is causing interference to a neighboring Channel Assignment Cluster.

3. The apparatus according to claim 2, wherein the channel assignment manager is further configured to assign a set of available channels to every Channel Assignment Cluster corresponding to available channels for the Channel Assignment Cluster.

4. The apparatus according to claim 3, wherein the channel assignment manager is configured to sort unassigned Channel Assignment Clusters into a prioritized list.

5. The apparatus according to claim 4, wherein the prioritized list is sorted by one of a group consisting of a channel deficit value, the overlap weight, the tier weight, a combination of channel deficit, the tier weight and the overlap weight, and number of channels remaining in the set of available channels.

6. The apparatus according to claim 4, wherein the channel assignment manager is configured to assign a channel from the set of available channels for the Channel Assignment Cluster to the Channel. Assignment Cluster having a highest priority on the prioritized list.

7. The apparatus according to claim 6, wherein the channel assignment manager is configured to sort the set of available channels into an adjacency list sorted from higher bandwidth channels to lower bandwidth channels; and
    wherein the assigned channel is the available channel with the highest bandwidth on the adjacency list.

8. The apparatus according to claim 6, wherein the channel access manager is further configured to:
    remove the assigned channel from the set of available channels of neighboring Channel Assignment Clusters;
    adjusting an edge weight cost for the assigned channel and re-sort the adjacency list after assigning the channel; and
    re-sort the unassigned Channel Assignment Clusters into a second prioritized list after removing the assigned channel from the set of available channels of neighboring Channel Assignment Clusters.

9. The apparatus according to claim 6, wherein the channel assignment manager is configured to acquire a set of available channels for a neighboring Channel Assignment Cluster before assigning the channel;
    wherein the channel assignment manager selects a channel from the set of available channels that does not exhaust the set of available channels for the neighboring Channel Assignment Cluster.

10. The apparatus according to claim 3, wherein the channel assignment manager is configured to remove the channel for the fixed interference source from the set of available channels of each neighboring Channel Assignment Cluster.

11. The apparatus according to claim 1, wherein the channel assignment manager is further configured to determine a number of channels to mitigate overlap; and
    wherein the channel assignment manager is further configured to convert the available number of channels to match the number of channels to mitigate overlap.

12. The apparatus according to claim 11, wherein the channel assignment manager converts the available number of channels by performing one of a group consisting of
    converting a wideband channel into at least two channels having a narrower band and adjusting overlap weights to reduce overlap.

13. The apparatus according to claim 1, wherein the channel assignment manager is further configured to determine a number of channels to mitigate overlap; and
    wherein the channel assignment manager is configured to convert at least two channels into a single channel having a bandwidth that is a combined bandwidth of the at least two channels.

14. The apparatus according to claim 1, wherein the channel assignment manager is configured to sort the Channel Assignment Clusters in accordance with the tier weight determined for each of the Channel Assignment Clusters.

15. The apparatus according to claim 14, wherein the channel assignment manager is configured to split the Channel Assignment Clusters into one or more tiers, wherein the Channel Assignment Clusters in higher tiers have a higher tier weight.

16. A method, comprising:
    receiving a neighbor report from managed wireless access points on a network;
    grouping the managed access points into a plurality of Channel Assignment Clusters, wherein the plurality of Channel Assignment Clusters correspond to a plurality of sub-trees of a spanning tree network;
    determining, from the neighbor reports, which of the plurality of Channel Assignment Clusters interfere with other of the plurality of Channel Assignment Clusters;
    determining fixed interference sources;

determining a degree value for a channel assignment cluster, the degree value is equal to a sum of interfering neighboring channel assignment clusters and the fixed interference sources; and determining a tier weight for the Channel Assignment Clusters, wherein the tier weight is based on a level in the spanning tree and a traffic load based on relative channel time usage values of radios of the Channel Assignment Clusters.

17. The method according to claim 16, further comprising assigning a set of available channels to every basic service set.

18. The method according to claim 17, further comprising removing a channel from the set of available channels from the Channel Assignment Cluster responsive to determining a neighboring fixed interference source to the Channel Assignment Cluster.

19. The method according to claim 17, further comprising sorting unassigned basic service sets into a prioritized list; wherein the prioritized list is sorted by one of a group consisting of the overlap weight, the tier weight, and a combination of the tier weight and the overlap weight.

20. The method according to claim 19, further comprising:

assigning a channel from the set of available channels to an unassigned basic service set having the highest priority in the prioritized list;

removing the assigned channel from the set of available channels of neighboring Channel Assignment Clusters; and sorting the unassigned basic service sets into a second prioritized list after removing the assigned channel from the set of available channels of neighboring Channel Assignment Clusters.

21. The method according to claim 16, further comprising: determining a number of channels to mitigate overlap; converting a number of available channels to equal the number of channels to mitigate overlap;

wherein converting the number of available channels comprises performing one of a group consisting of converting a wideband channel into at least two channels having a narrower band and adjusting overlap weights to reduce overlap between Channel Assignment Clusters.

22. Logic encoded in a non-transitory computer readable medium for execution by a processor, and when executed is operable to:

receive a neighbor report from managed wireless access points on a network;

group the managed access points into a plurality of Channel Assignment Clusters, wherein the plurality of Channel Assignment Clusters correspond to a plurality of sub-trees of a spanning tree network;

determine, from the neighbor reports, which of the plurality of Channel Assignment Clusters interfere with other of the plurality of Channel Assignment Clusters;

determine fixed interference sources;

determine a degree value for a channel assignment cluster, the degree value is equal to a sum of interfering neighboring channel assignment clusters and the fixed interference sources; and determine a tier weight for the Channel Assignment Clusters, wherein the tier weight is based on a level in the spanning tree and a traffic load based on relative channel time usage values of radios of the Channel Assignment Clusters.

23. The logic set forth in claim 22, further operable to determine a channel spacing value to the channel assignment cluster to enforce a minimum channel separation between neighboring Channel Assignment Clusters.

* * * * *